(12) United States Patent
Huang et al.

(10) Patent No.: US 9,811,711 B2
(45) Date of Patent: Nov. 7, 2017

(54) FINGERPRINT DETECTION WITH TRANSPARENT COVER

(71) Applicant: Microsoft Technology Licensing, LLC, Redmond, WA (US)

(72) Inventors: Jiandong Huang, Bellevue, WA (US); Liying Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 14/628,293

(22) Filed: Feb. 22, 2015

(65) Prior Publication Data

US 2016/0247010 A1    Aug. 25, 2016

(51) Int. Cl.
*G06K 9/00* (2006.01)
*G02B 5/20* (2006.01)

(52) U.S. Cl.
CPC ........... *G06K 9/00046* (2013.01); *G02B 5/20* (2013.01); *G06K 9/0004* (2013.01); *G06K 9/00087* (2013.01)

(58) Field of Classification Search
CPC ............. G06K 9/00046; G06K 9/0004; G06K 2009/0006
See application file for complete search history.

(56) References Cited

U.S. PATENT DOCUMENTS

| | | | |
|---|---|---|---|
| 5,808,729 A | 9/1998 | Sugawara et al. | |
| 6,885,439 B2 | 4/2005 | Fujieda | |
| 7,366,331 B2 | 4/2008 | Higuchi | |
| 2003/0118219 A1 | 6/2003 | Higuchi et al. | |
| 2004/0252867 A1 | 12/2004 | Lan et al. | |
| 2009/0039241 A1 | 2/2009 | Ueki | |
| 2016/0224816 A1† | 8/2016 | Smith | |

FOREIGN PATENT DOCUMENTS

| | | |
|---|---|---|
| EP | 1271389 A2 | 1/2003 |
| WO | 2016119492   † | 4/2016 |

OTHER PUBLICATIONS

"International Preliminary Report on Patentability Issued in PCT Application No. PCT/US2016/016250", dated Sep. 28, 2016, 6 Pages.

"Second Written Opinion Issued in PCT Application No. PCT/US2016/016250", dated Jul. 6, 2016, 5 Pages.

"International Search Report & Written Opinion Issued in PCT Application No. PCT/US2016/016250", dated Apr. 22, 2016, 10 Pages.

(Continued)

*Primary Examiner* — Jerry Rahll
(74) *Attorney, Agent, or Firm* — Lempia Summerfield Katz LLC

(57) ABSTRACT

An electronic device includes a transparent cover and a light source disposed at an edge of the transparent cover. The light source is configured to inject light into the transparent cover. The transparent cover guides the light until interaction with a fingerprint ridge at the transparent cover. The electronic device further includes a filter disposed along the transparent cover. The filter is configured to selectively allow the light scattered by the fingerprint ridge to pass through the filter. A detector generates a signal indicative of the scattered light allowed through the filter.

20 Claims, 3 Drawing Sheets

(56) References Cited

OTHER PUBLICATIONS

Davide Maltoni, "Fingerprint Recognition—Sensing, Feature Extraction and Matching", Summer School for Advanced Studies on Biometrics: Autentication and Recognition, Jun. 2-6, 2003, 17 pages.
Holz et al., "Fiberio: A Touchscreen that Senses Fingerprints", Proceedings of the 26th Annual ACM Symposium on User Interface and Technology, Oct. 8, 2013, 10 pages.
Jean-Francois Mainguet, "Fingerprint Sensing Techniques", Jul. 29, 2010, available at: http://fingerchip.pagesperso-orange.fr/biometrics/types/fingerprint_sensors_physics.htm#electro-optical.
Shikai et al., "Fingerprint Sensor Using Fiber Optic Faceplate", Proceedings of SPIE 2932, Human Detection and Positive Identification: Methods and Technologies, Jan. 28, 1997, 2 pages.
Xia et al., "Innovations in Fingerprint Capture Devices", Proceedings of Pattern Recognition, Feb. 2003, 9 pages, vol. 36, Issue 2.

† cited by third party

FINGERPRINT DETECTION WITH TRANSPARENT COVER

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
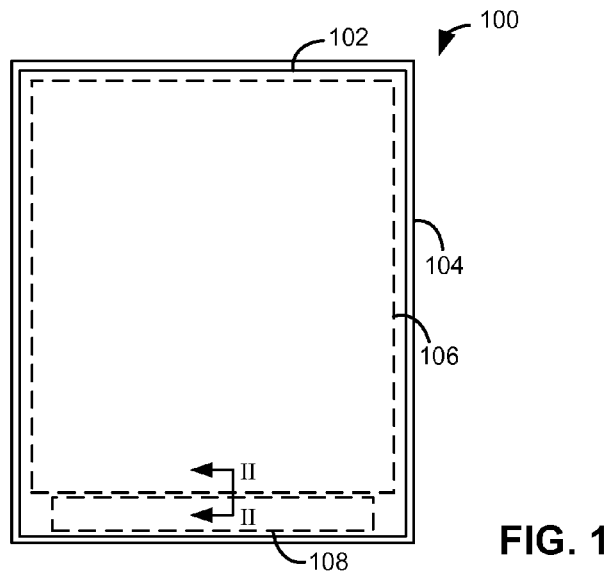
FIG. 1 is a schematic, plan view of an electronic device with fingerprint detection in accordance with one example.

While the disclosed devices and systems are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Fingerprint image acquisition is a common biometric identification technique. Electronic devices may use fingerprint image acquisition (or fingerprint detection) for user identification or authentication. Fingerprint detection may be used in a variety of electronic device contexts, including, for instance, those in which the primary function of the electronic device is identification. Fingerprint detection may also be used as a mechanism for authentication on a smartphone, tablet, laptop, wearable device, or other device.

Fingerprint detection is achieved through a transparent cover of the electronic device. The transparent cover, such as a cover glass layer (or cover glass), may define the external surface of a display module of the electronic device. The transparent cover is also an integral component of the fingerprint sensor. The transparent cover may guide light used to illuminate ridges of the finger in contact with the transparent cover. An image of the fingerprint may then be captured (or detected) using a filter (e.g., a filter layer) to selectively allow certain rays of the light scattered by the fingerprint ridges to reach a detector.

Thinner electronic devices may be achieved through the cover-based detection techniques. Use of the transparent cover as a waveguide (or light guide) avoids adding any thickness to those devices already relying on the transparent cover as the external surface of the display module. The remaining components of the fingerprint sensor may be arranged in a stack of thin layers or films adjacent the transparent cover. The cover-based techniques may thus be implemented in a smaller space than camera-based techniques that rely on lenses and other optical components to resolve the fingerprint ridges through the cover glass. Such optical components often involve considerable volume (e.g., thickness). The cover-based techniques may thus be useful in connection with mobile phones and other handheld or portable electronic devices where a thin profile (or form factor) is desirable.

The cover-based fingerprint detection is compatible with a wide variety of device form factors. The filter (or filter layer) may be scaled to adjust the thickness of the fingerprint sensor. For example, the filter may include a fiber optic faceplate or other bundle of optical fibers, the length of which may be scaled to suit the application, e.g., the thickness of the electronic device. Scaling the filter thickness may thus be used to accommodate different types of display modules, which may differ considerably in thickness. For example, the thickness of the filter layer may be adjusted to accommodate devices having backlit displays (e.g., liquid crystal displays) and displays without a separate backlight unit (e.g., organic light emitting diode (OLED) displays).

The use of the transparent cover and adjacent filter for fingerprint detection may also support fingerprint sensors of varying sizes. The lateral extent of these layers of the fingerprint sensor may be easily scaled to attain a desired size or shape. A wide fingerprint detection area may thus be achieved, which may be useful in situations in which multiple fingers are imaged simultaneously.

Use of the transparent cover for fingerprint detection may simplify the enclosure of the electronic device. The transparent cover may thus extend across both the area of the display module, as well as the area directed to fingerprint detection. For instance, the transparent cover may extend across the entire front face of the electronic device. A separate cover or other external element to protect the other components of the fingerprint sensor is not required. The integration of the transparent cover into the fingerprint sensor may thus reduce the component count and/or complexity of the device.

The filter (or filter layer) of the fingerprint sensor compensates for blurring that would otherwise arise due to the thickness of the transparent cover. The filter increases the resolution (or signal to noise ratio) of the fingerprint detection by filtering out light rays scattered by the finger at wide angles. The filter only allows a narrow cone of light rays, e.g., those rays that are sufficiently vertical (or transverse to the detector), to reach the detector. Blurring of the fingerprint image arising from the wide-angle rays may thus be avoided. In fiber bundle examples, the optical fibers of the filter may be configured such that the numerical aperture of each optical fiber establishes a narrow cone of acceptance. Light rays incident upon the fibers at angles outside of the acceptance cone are either reflected or absorbed, rather than guided to the detector. The optical fibers of the bundle may thus provide both filtering and image transmission functions. The diameter of each optical fiber may alternatively or additionally be used to establish a desired resolution level.

Although described in connection with electronic devices having touchscreens, the internal support may be used in connection with a wide variety of electronic devices, including those not having a touch-sensitive display. The size and form factor of the electronic device may vary considerably. Devices may range from wearable or handheld devices, to laptop computers, and to televisions or other wall-mounted displays or other large-scale devices. The composition and other characteristics of the display module and other components of the electronic device may vary accordingly.

FIG. 1 is a plan view of an electronic device 100 having a transparent cover 102 and a shell 104. The shell 104 may be opaque or non-transparent. In this example, the transparent cover 102 and the shell 104 together form an enclosure or housing for the electronic device 100. The outer or external surface of the transparent cover 102 may thus be exposed. The transparent cover 102 extends along or defines a front face of the housing. The shell 104 is disposed along a rear face of the electronic device 100 and may wrap around edges or lateral sides of the electronic device 100 to establish, for instance, a bezel of the housing. Alternatively or additionally, the transparent cover 102 is disposed along one or more edges of the housing. For example, the housing may not include the shell 104.

The electronic device 100 may include a display area 106 and a fingerprint area 108. The display area 106 is directed to rendering images via a display module. The display module (see, e.g., FIG. 2) may thus be sized to support the display area 106. The fingerprint area 108 is directed to capturing an image of the finger for fingerprint detection. The areas 106, 108 may be adjacent (e.g., contiguous) with one another. In the example of FIG. 1, both the display area 106 and the fingerprint area 108 are disposed on or along the front face of the housing, with the fingerprint area 108 below the display area along a bottom edge of the housing. The areas 106, 108 may be disposed in other locations. For instance, the fingerprint area 108 may be alternatively or additionally disposed along other edges, such as a side edge of a laptop display. One or both of the areas 106, 108 may be located on additional or other faces or sides of the housing. In some cases, the areas 106, 108 are disposed on different faces or sides of the housing. For example, the fingerprint area 108 may be disposed along a side, edge, or rear face of the housing.

In the example of FIG. 1, the fingerprint area 108 is shaped as a strip elongated in the dimension of the bottom edge of the housing. The width of the fingerprint area 108 may be selected to accommodate multiple fingers. For example, the fingerprint area 108 may have the same width as the display area 106. The size, or lateral extent, of the fingerprint area 108 may vary from the example shown. For example, the fingerprint area 108 may be sized to image a single finger (e.g., a thumb). In such cases, the fingerprint area 108 may be centered along one of the edges of the housing.

The transparent cover 102 may extend across both the display area 106 and the fingerprint area 108. Alternatively, the electronic device 100 may include multiple transparent covers. For example, respective transparent covers may be provided for the display area 106 and the fingerprint area 108.

The transparent cover 102 may include or be composed of glass, plastic, and/or other transparent materials. For example, the transparent cover 102 may be configured as, or composed of, cover glass. In some cases, the cover glass may be composed or include the GORILLA® glass material commercially available from Corning Incorporated. A variety of other glass and non-glass materials may be alternatively or additionally be used, including, for example, a float glass plate, a Polymethyl methacrylate (PMMA) panel, or a polycarbonate panel. The transparent cover 102 may be a layer implemented as a top layer of the display or may be added on a display to serve solely as a cover layer.

The cover glass or other transparent cover 102 may have a hardness and/or thickness suitable to act as a protection layer for the electronic device 100. The hardness is directed to scratch resistance. The thickness may be directed to structural rigidity and other structural support. Both the hardness and the thickness of the transparent cover 102 may vary. For example, the transparent cover 102 may be flexible in some cases. The transparent cover 102 may have a thickness greater than about 300 microns. In some cases, the transparent cover 102 has a thickness between about 400 microns and about 500 microns, although thicknesses greater than 500 microns may be used.

During operation, a finger is placed upon the exposed surface of the transparent cover 102 within the fingerprint area 108 for imaging (or detection). The fingerprint is thus imaged or detected through the thickness of the transparent cover 102. Thus, without more, thicknesses greater than about 100 microns may lead to an unacceptable amount of blurring. The blurring is a result of scattering, as described below. For example, with a thickness of 400 microns, the transparent cover 102 would spread a point source over a distance of 0.716 mm, which would render the approximate 50 micron features of the fingerprint unresolvable. However, the fingerprint detection techniques described herein provide filtering (e.g., spatial filtering) to reduce or remove such blurring. The fingerprint detection techniques described herein may thus allow the thickness of the transparent cover 102 to vary, and not constitute a limit or constraint on the fingerprint detection.

The transparent cover 102 may be a single layer or include multiple constituent layers of different materials. For example, the transparent cover 102 may include a glass layer and one or more light management films. Alternatively or additionally, the transparent cover 102 may include one or more layers configured to provide structural or other protection for the electronic device 100. One or more of the constituent layers of the transparent cover 102 may be used for fingerprint detection. The constituent layers may or may not be index-matched to one another.

The transparency of the transparent cover 102 may be limited to, or customized for, one or more wavelength ranges. The wavelength range(s) may be used for fingerprint detection. For example, a wavelength (or wavelength range) outside of the visible range may be used for fingerprint detection. In this example, the transparent cover 102 is also transparent within the visible wavelength range to allow transmission of the light generated by the display of the electronic device 100.

The front and back surfaces of the transparent cover 102 may be sufficiently smooth to support total internal reflection of the light used for fingerprint detection. For example, one or both of the surfaces may be polished.

Figure 2:
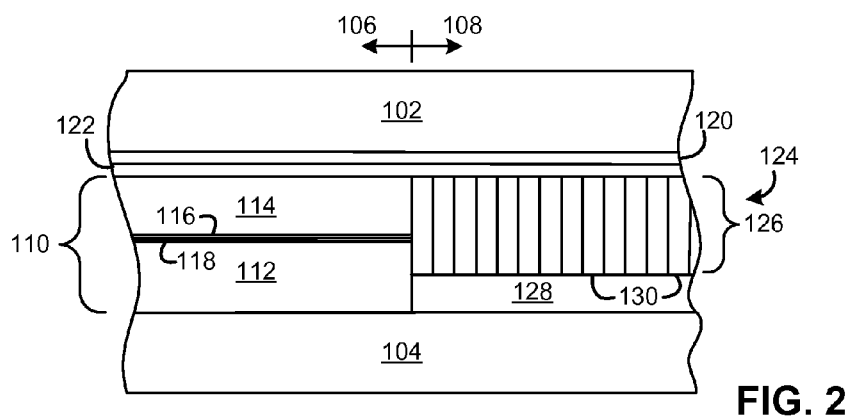
FIG. 2 is a partial, schematic, cross-sectional view of the electronic device of FIG. 1 taken along lines II-II of FIG. 1.

FIG. 2 shows a partial cross-sectional view of the electronic device 100 to depict the display area 106 and the fingerprint area 108 in greater detail. In this example, both the transparent cover 102 and the shell 104 extend across the boundary between the areas 106, 108. In the display area 106, the electronic device 100 includes a number of components arranged in a display module 110. The display module 110 is disposed along the transparent cover 102. In this example, the display module 110 is sized to take up most, if not all, of the spacing between the transparent cover 102 and the shell 104. In other example, other components of the electronic device 100 may be disposed between the display module 110 and shell 104, including, for instance, a battery.

In the example of FIG. 2, the display module 110 includes a backlight unit (BLU) 112 and a liquid crystal (LC) panel 114 illuminated by the BLU 112. Various types of display technologies may be used, including, for instance, various types of LCD displays, such as super-twisted nematic and other twisted nematic LCD displays, and various thin-film transistor (TFT) displays, including OLED displays. Each of the BLU 112 and the LC panel 114 may, in turn, include a number of constituent layers or components. For example, the BLU 112 may include a light guide plate and a number of light sources (e.g., a light emitting diode (LED) array) mounted along one or more edges of the light guide plate. Alternatively or additionally, the BLU 112 may include a number of planar emission devices. The LC panel 114 may include a stack of layers, such as glass substrate layers, an LC layer, and polarizers and/or other films. The display module 110 may also include one or more light management layers or films 116, 118. For example, the light management layers 118 may be a diffuser film. The components, configuration, and other characteristics of the display module 110 may vary considerably from the example shown. For instance, the display module 110 may include an OLED layer instead of the BLU 112 and the LC panel 114. In still other cases, the OLED layer acts as the BLU 112. The backlight unit 118 (or display module 110 more generally) may include any number of additional light management films or layers. The display module 110 may include one or more structural frames to support the constituent films or layers of the display module 110. The frame(s) are not shown in the drawing figures for ease in illustration of the display module 106 and other internal components of the device 100.

The display module 110 may also include a touch sensor layer 120 and one or more adhesive layers 122. The touch sensor layer 120 may be part of a touch sensing unit (or touch sensor) directed to configuring the display of the electronic device 100 as a touchscreen or other touch-sensitive area. The adhesive layer 122 may be directed to fixedly securing the LC panel 114 to the transparent cover 102. In the example of FIG. 1, the touch sensor layer 120 and the adhesive layer 122 extend across both the display area 106 and the fingerprint area 108. Disposition of the touch sensor layer 120 may be useful to initiate fingerprint detection based on the occurrence of a touch event in the fingerprint area 108. Components of the electronic device 100 directed to fingerprint detection may thus usually remain inactive, which may lead to lower power consumption and/or lower computing resource requirements. The touch sensor layer 120 and the adhesive layer 122 may thus not be considered components of the display module 110 alone.

The touch sensor layer 120 may use various types of touch sensor technologies. For example, the touch sensor layer 120 may include one or more films configured to support capacitive or resistive touch sensing, although other technologies may be used, including, for instance, acoustic touch sensing. In one case, the touch sensor layer 120 includes a film printed or otherwise formed on the back (non-exposed) face of the transparent cover. In another case, the touch sensor layer 120 includes two sets of lines that form an orthogonal grid, in which the sets are isolated from one another.

The adhesive layer 122 may be or include one or more optically clear adhesive materials. The adhesive material(s) may be index-matched to the transparent cover 102 and/or a top layer of the display module 110. Alternatively, the refractive indices of the adhesive layer 122 and the transparent cover 102 (and/or other adjacent layer) are offset to an extent that does not affect the display and/or fingerprint detection functionality of the device 100.

The electronic device 100 includes a fingerprint sensor 124 (or reader or other detector) in the fingerprint area 108. The fingerprint sensor 124, in turn, includes a filter 126 and a detector 128 in addition to the transparent cover 102. The filter 126 and/or the detector 128 may be configured as respective layers of the fingerprint sensor 124. The filter 124 is disposed adjacent and along the transparent cover 102. In this example, the touch sensor layer 120 is disposed between the transparent cover 102 and the filter 126. The touch sensor layer 120 may extend across an entire lateral extent of the filter 126. The filter 126 may be secured to the transparent cover 102 by the adhesive layer 122, as shown. The filter 126 and/or the detector 128 may thus be arranged in a stack or other layered arrangement between (and/or including) the transparent cover 102 and the shell 104.

The filter 126 is configured to selectively allow light interacting with a finger at the transparent cover 102 to reach the detector 128. As described below, light rays interacting with a finger are scattered by the ridges of a fingerprint in contact with the transparent cover 102. The filter 126 allows some of the scattered rays to pass through the filter 124 to reach the detector 128. As also described below, the light rays may be provided by a light source dedicated to the fingerprint detection. The filter 124 may filter out those rays that are scattered at wide angles to reduce blurring or spreading of the image of the fingerprint ridge.

In the example of FIG. 2, the filter 126 includes a plurality of optical fibers 130 disposed between the transparent cover 102 and the detector 128. The fibers 130 may be arranged in a two-dimensional array, or fiber bundle, in which the optical fibers 130 are disposed side-by-side. The fiber bundle may be carried by, or mounted on, a fiber optic faceplate. The fiber optic faceplate or fiber bundle may orient the optical fibers 130 as a coherent fiber bundle such that a first end of each fiber 130 is adjacent the transparent cover 102 and a second end of each fiber 130 is adjacent the detector 128. Each optical fiber 130 is oriented to guide the light scattered by the fingerprint ridge to the detector 128 if the light is directed at an incidence angle within a cone of acceptance of the optical fiber 130. The filter 126 may thus be configured to prevent the light scattered by a fingerprint ridge from reaching the detector 128 if the light is not directed at an incidence angle within a cone of acceptance of one of the optical fibers 130. The fibers 130 thus act as a filter rather than as solely an image transfer mechanism, as the fibers may if the fibers were not spaced from the finger by the transparent cover 102.

The incidence angle for the acceptance cone is defined relative to the surface normal, or normal to the optical interface at the filter 126. As depicted in the example of FIG. 2, the surface normal corresponds with a vertical line extending upward from the filter interface. Hence, light rays that may fall within the acceptance cone and, thus, be allowed to pass to the detector 128, are those that are sufficiently close to perpendicular to the filter interface. The acceptance cone may thus establish spatial filtering for the fingerprint detection.

The optical fibers 130 are configured to have a numerical aperture (NA) that establishes an acceptable size (breadth) of the acceptance cone. The numerical aperture may be low to limit the size of the acceptance cone and, thus, the spreading or blurring of the fingerprint image. In some cases, the numerical aperture falls in a range from about 0 to about 0.15, which translates into acceptance cone angles of about 0 to about 17 degrees. For example, the numerical aperture may be about 0.12, although other NA levels may be used. The range of suitable NA levels may depend upon the thickness of the transparent cover 102, the refractive index of the transparent cover 102 (e.g., the fore glass), and the fiber pitch in the filter 126, as well as the desired resolution of the fingerprint detection.

The numerical aperture of the optical fibers 130 may thus be significantly different from NA levels typically relied upon in other fiber optic applications. For instance, optical fiber faceplates used in the night vision and medical imaging industries often have NA levels of 1.0 or more to provide sufficient light gathering capability. Increasing the NA level makes it easier to couple light into the optical fiber. In contrast, the optical fibers 130 are instead providing a filtering function in the fingerprint sensor 124. The resolution of the fingerprint sensor 124 may thus benefit from NA levels below (e.g., well below) 0.15.

Such low NA levels may be achieved and, thus, correspondingly narrow acceptance cones, through the composition of the optical fibers 130. A small NA level is achieved when the refractive indices of the core and cladding materials are close. Core and/or cladding materials may thus be selected to have respective refractive indices that are fairly close to one another.

The proximity of the respective refractive indices may lead to fibers that weakly confine the scattered light (e.g., even after acceptance). Some light may leak through the cladding of the fibers 130. The bundle of optical fibers may accordingly include opaque optical fibers (e.g., black glass fibers) or other absorbing regions to absorb any light rays that escape from one of the fibers 130 used to transmit the light rays to the detector 128. For example, extra-mural absorption (EMA) glass may be used. Each absorbing region may be configured to absorb the light scattered by the fingerprint ridge and not directed at an angle within the cone of acceptance of one of the optical fibers 130. Each absorbing region may be interstitially disposed between respective adjacent optical fibers 130. For example, the absorbing material may be circumferentially disposed around the transmissive optical fibers 130, replace (e.g., randomly) some of the fibers, or be incorporated as narrower or smaller interstitial fibers. In some cases, the optical fibers 130 may include an arrangement in which the fibers 130 alternate between transmissive and absorbing fibers. Further information is provided below in connection with the examples of FIGS. 3-5.

The pitch of the fiber bundle arrangement may be configured to achieve a desired resolution level for the fingerprint detection. For example, the pitch (or center-to-center distance between adjacent fibers 130) of the fiber bundle may be about 6 microns, which is well below the minimum feature size of the fingerprint (e.g., about 50 microns). Other fiber bundle pitches less than the minimum feature size may be used. The fiber bundle pitch may be selected in accordance with (e.g., to match) the resolution (e.g., pixel size) of the detector 128.

The detector 128 is configured to generate a signal indicative of the scattered light allowed through the filter 126. The detector 128 is disposed adjacent the filter 126 to capture light allowed through the filter 128. The detector 128 may thus be adjacent (e.g., contiguous) with the filter 126. In this example, the detector 128 is also contiguous with the shell 104, although other components may be disposed within the housing of the electronic device 100 in the fingerprint area 108.

The detector 128 may be any photosensor or photodetector array to capture the scattered light. For example, the detector 128 may be or include a photodetector circuit having a number of photodiodes. The photodiodes may be arranged as, or define, pixels of a two-dimensional array (e.g., a photodetector array). Other types of detection technologies may be used, including, for instance, charge coupled device (CCD) image sensing and complementary metal-oxide-semiconductor (CMOS) or flat panel detectors.

The thickness of the filter 126 is scalable. The filter 126 may thus be sized to accommodate (e.g., fill) the space available within the housing of the electronic device 100 (FIG. 1). In the example of FIG. 2, the thickness may be adjusted by selecting a desired length of the optical fibers 130. The light propagates through the fibers 130 with negligible loss, provided that the incidence angle of the light is within the numerical aperture of the fiber 130. The length of the optical fibers 130 may thus be varied without changing the filtering capability of the filter 126 or blurring the images. Neither the selection nor the transmission of the scattered light to the detector 128 is adversely affected by increasing the fiber length. As a result, the fingerprint sensor 124 is well suited for a wide variety of applications and device form factors.

Figure 3:
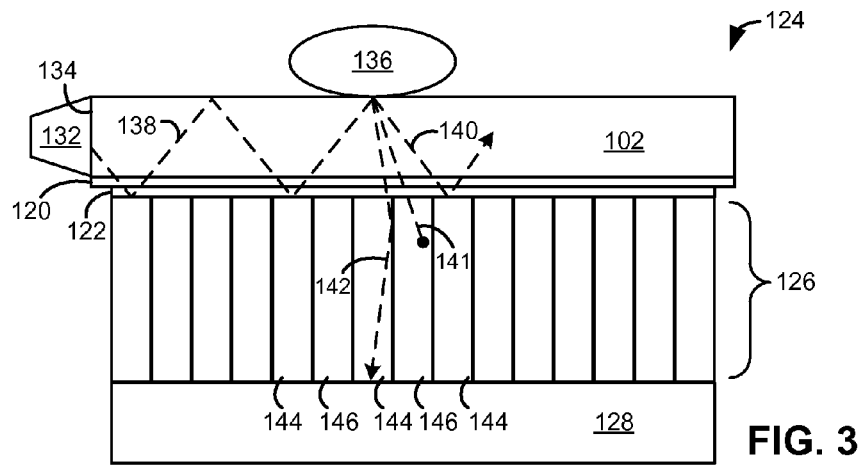
FIG. 3 is a partial, schematic, cross-sectional view of a fingerprint sensor of the electronic device of FIG. 1 in accordance with one example.

FIG. 3 shows the fingerprint sensor 124 in greater detail to depict the manner in which a fingerprint is imaged or detected through the transparent cover 102 during operation. The fingerprint sensor 124 includes a light source 132 disposed at an edge 134 of the transparent cover 102. In this example, the light source 132 is mounted such that an output surface of the light source 132 is contiguous with the surface of the edge 134. The surfaces may also be coextensive or otherwise matched or configured to confine the light to the transparent cover 102. The light source 132 is configured to inject light into the transparent cover 102. The transparent cover 102 guides the light until interaction with a fingerprint ridge 136 at (e.g., in contact with) the transparent cover 102.

The light source 132 may be or include one or more light emitting diode (LED) devices. Other types of light sources may be used. The LED devices or other light source 132 may be configured to generate at a wavelength (or in a wavelength range) that avoids disturbing the device user or interfering with the light emitted in the display area 106 (FIGS. 1 and 2). The wavelength may thus fall outside of the visible range in some cases. For example, the light may have a wavelength in the near infrared (IR) range, such as between about 780 nm and about 950 nm, such as about 850 nm, although a wide variety of wavelengths may be used in connection with the fiber bundle-based filter 126 of the example of FIG. 3, including those that fall within the visible range.

During operation, the light source 132 emits light rays to illuminate the fingerprint for imaging. Each of the light rays enter the transparent cover 102 at the edge 134. The light rays are then guided by the transparent cover 102 until interaction with the fingerprint ridge 136. The interaction involves scattering (e.g., back scattering) of the light rays once the fingerprint ridge frustrates the total internal reflection at the exposed face of the transparent cover 102.

An exemplary light ray 138 is shown to depict the guided path and eventual scattering. The light ray 138 first encounters the back (or inner) face of the transparent cover 102. An optical interface may be defined at the back face of the transparent cover 102 with the adhesive layer 122 (the "cover-adhesive interface"). To reach the adhesive interface, the light ray 138 may pass between (or bypass) elements of the touch sensor layer 120, which is depicted as a continuous (rather than discontinuous) layer for ease in illustration. While the touch sensor layer 120 may interfere with and disturb the light ray 138, compensation may be used to reduce or eliminate any effects of the touch sensor layer 120. For example, a background image may be made of the detection area when no finger is present over the transparent cover 102. Any effects of the touch sensor layer 120 may be observed in the background image. The background image may then be subtracted from actual images taken in normal operation of the detection area to remove unwanted effects of the touch sensor layer 120. Other compensation mechanism may be implemented. Alternatively or additionally, the system may be designed such that the wavelength of the light emitted by light source 132 is not scattered by the materials of touch sensor layer 120. For example, touch sensor layer 120 may be composed of Indium tin oxide (ITO), which is transparent to visible and near IR light. At this point, the light ray 138 passes through the cover-adhesive interface. The light ray 138 may pass through the cover-adhesive interface because the adhesive layer 122 and the transparent cover 102 may be index-matched or sufficiently index-matched so that the critical angle is exceeded. The light ray 138 may alternatively reflect off the cover-adhesive interface through total internal reflection. In the example of FIG. 3, the light ray 138 eventually encounters the interface between the adhesive layer 122 and the filter 126 (the "adhesive-filter interface"). At this point, the angle of incidence of the light ray 138 does not fall within the acceptance cone of the filter 126 (or fibers thereof). The light ray 138 is thus reflected back toward the front (exposed) surface of the transparent cover 102, at which further total internal reflection occurs. The light ray 138 again reflects off the adhesive-filter interface before encountering the fingerprint ridge 136.

The presence of the fingerprint ridge 136 at the exposed surface of the transparent cover 102 frustrates the total internal reflection at that interface. For example, contact between the fingerprint ridge 136 and the exposed surface of the transparent cover 102 is sufficient to change the boundary condition at the exposed surface. The light ray 138 thus interacts with the fingerprint ridge 136. At least some of the light from the light ray 138 is scattered back toward the filter 126. For ease in illustration, the back scattering is depicted as including three light rays 140-142. The light rays 140-142 are distributed over the ends of a number of optical fibers of the filter 126. In this case, the filter 126 includes both transmissive fibers 144 and absorbing fibers 146. The transmissive and absorbing fibers 144, 146 may alternate as shown.

The light ray 140 is incident upon the adhesive-filter interface at the largest angle, which, in this case, is outside the acceptance cone. Thus, even though the light ray 140 encounters one of the transmissive fibers 144, the light ray 140 is accordingly reflected back into the transparent cover 102, at which point the light ray 140 may be used to illuminate another fingerprint ridge. The light ray 141 is not scattered as widely as the light ray 140 and, therefore, encounters one of the absorbing fibers 144. The light ray 141 may or may not have been incident at an angle within the acceptance cone. Either way, the light ray 141 is absorbed before reaching the detector 128.

The light ray 142 is incident upon one of the transmissive fibers 144 at an incidence angle small enough to fall within the acceptance cone. The light ray 142 thus exits the waveguide provided by the transparent cover 102 and enters the fiber 144. Once entered, the light ray 142 is transmitted via the fiber 144 to the detector 128. As shown in FIG. 3, the small incidence angle leads to a pixel position (e.g., the position at which the light ray 142 is captured by the detector 128) roughly equal to the position at which the light ray 138 interacted with the fingerprint ridge 136. An image may thus be rendered for the fingerprint ridge 136 with little to no blurring or spreading.

The refractive indices of the transparent cover 102 and the adhesive layer 122 may be selected to facilitate guiding of the light ray 138. For instance, the transparent cover 102 may have a relatively high refractive index relative to for instance, the refractive index of the cores of the fibers 144. In some cases, the transparent cover 102 has a refractive index that falls within a range from about 1.49 to about 1.60, such as 1.51, but other indices may be used. The adhesive layer 122 may have a refractive index that does not match a refractive index of the transparent cover 102. Examples of suitable adhesive materials include silicone-based, optically clear adhesive materials, which may have a refractive index of about 1.40.

The construction and configuration of the device 100 may vary from the example shown in FIGS. 1-3. Further examples are addressed in connection with a number of the other drawing figures.

Figure 4:
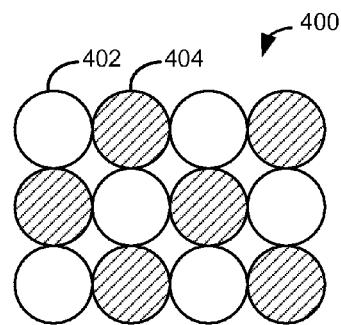
FIG. 4 is a schematic depiction of a fiber bundle arrangement of the fingerprint sensor of FIG. 3 in accordance with one example.
Figure 5:
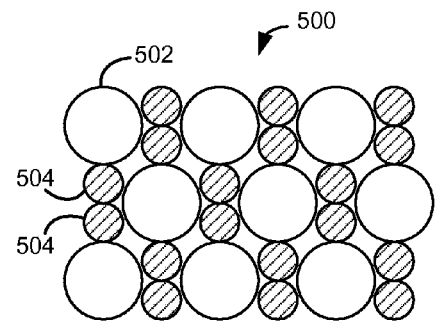
FIG. 5 is a schematic depiction of a fiber bundle arrangement of the fingerprint sensor of FIG. 3 in accordance with another example.

FIGS. 4 and 5 depict alternative fiber bundle arrangements for a filter (or filter layer). In FIG. 4, a fiber bundle arrangement 400 includes alternating transmissive fibers 402 and absorbing fibers 404 of equal size. Each transmissive fiber 402 is surrounded by four adjacent absorbing fibers 404. In FIG. 5, a fiber bundle arrangement 500 also includes transmissive fibers 502 surrounded by absorbing fibers 504. In the example of FIG. 5, the absorbing fibers 504 are smaller than the transmissive fibers 502. As a result, the density of the transmissive fibers 504 may be increased, which may lead to higher fingerprint resolution. A wide variety of other fiber bundle arrangements may be used, including, for instance, arrangements in which the absorbing regions are shaped differently than the transmissive fibers.

Figure 6:
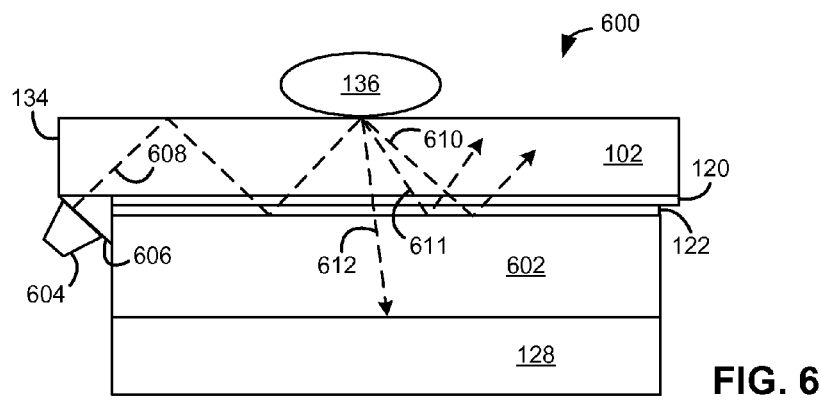
FIG. 6 is a partial, schematic, cross-sectional view of a fingerprint sensor having a film filter in accordance with one example.

FIG. 6 depicts a fingerprint sensor 600 having a different type of filter (or filter layer). In this example, the filtering function is provided by a filter film 602 having a sufficiently low refractive index. The filter film 602 is disposed in a stacked arrangement between the transparent cover 102 and the detector 128. The filter film 602 is composed of, or includes, a material having a refractive index lower than a refractive index of the transparent cover 102. The offset in refractive indices may be large enough to establish a critical angle that limits transmission through the filter to narrow angle light rays.

In some cases, the filter film 602 is composed of a material having an effective refractive index at certain wavelengths lower than air (e.g., less than 1.0). For example, the filter film 602 may be composed of titanium nitride, which has a refractive index of 0.7 at certain wavelengths. Other low-index materials may be used.

The fingerprint sensor 600 may include a light source 604 configured to generate light rays at an appropriate wavelength for the filter film 602. For example, in titanium nitride examples, the wavelength may be at or near 800 nm. Fingerprint imaging at such wavelengths may also be useful for avoid crosstalk or other interference from the light from the display module. The light source 604 is disposed at an edge 134 of the transparent cover 102. In this example, the light source 604 is mounted alongside the edge 134, which may provide space savings. The light source 604 may be mounted on an angled surface 606 to inject light rays at angles more conducive to illuminating the fingerprint ridge 136. The angled edge mounting shown in FIG. 6 may be used with any of the other examples described herein.

The filter film 602 may be a coating applied to the back surface of the transparent cover 102. For example, the filter film 602 may be applied after formation of the touch sensing layer 120 on the transparent cover 102. In such cases, the adhesive layer 122 may not be necessary.

The operation of the fingerprint sensor 600 may proceed in a manner similar to that described above in connection with the fiber bundle examples. An exemplary light ray 608 injected into the transparent cover 102 at the edge 134 undergoes total internal reflection at the front, exposed face of the transparent cover 102 and/or at or near the back face of the transparent cover 102 (e.g., one of the adhesive interfaces) until encountering the fingerprint ridge 136. The total internal reflection is frustrated by the fingerprint ridge 136 such that the light ray 608 is scattered back toward the filter film 602. Two light rays 610, 611 are scattered at angles too wide to exceed the critical angle, and thus remain guided by the transparent cover 102. A third light ray 612 is scattered at a narrow angle, thereby exceeding the critical angle. The light ray 612 is thus allowed to pass through the filter film 602 to reach the detector 128. As in the fiber-based examples described above, the narrow angle allows little to no spreading of the fingerprint image.

The filter film 602 may allow the fingerprint sensor 600 to have a thinner form factor than fiber-based filters. However, the thickness of the filter film 602 may also be adjusted to scale the fingerprint sensor 600 to an appropriate size.

Figure 7:
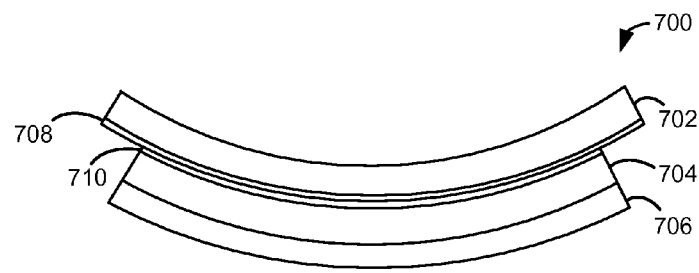
FIG. 7 is a partial, schematic, cross-sectional view of a transparent cover-based fingerprint sensor having flexible or curved filter and detector layers in accordance with one example.

FIG. 7 depicts an exemplary fingerprint sensor 700 in which one or more of the layers of a stacked arrangement are curved. In this example, a transparent cover 702, a filter 704, and a detector 704 are curved. To that end, one or more of the layers may be flexible or formed directly on another layer. For instance, a photodetector circuit of the detector 704 may be printed or otherwise formed on the filter 704. The filter 704, in turn, may be a low-index film coating applied to the back face of the transparent cover 702, which may be flexible and/or pre-deformed into the curved shape. Other layers, such as a touch sensor layer 708 and an adhesive layer 710 may also be applied in a flexible manner.

The composition of the layers may vary from the example shown. For instance, the filter 704 may include a fiber bundle instead of a low index film or coating. The constituent fibers of the fiber bundle may be bent into positions appropriate for the curvature of the stack.

Figure 8:
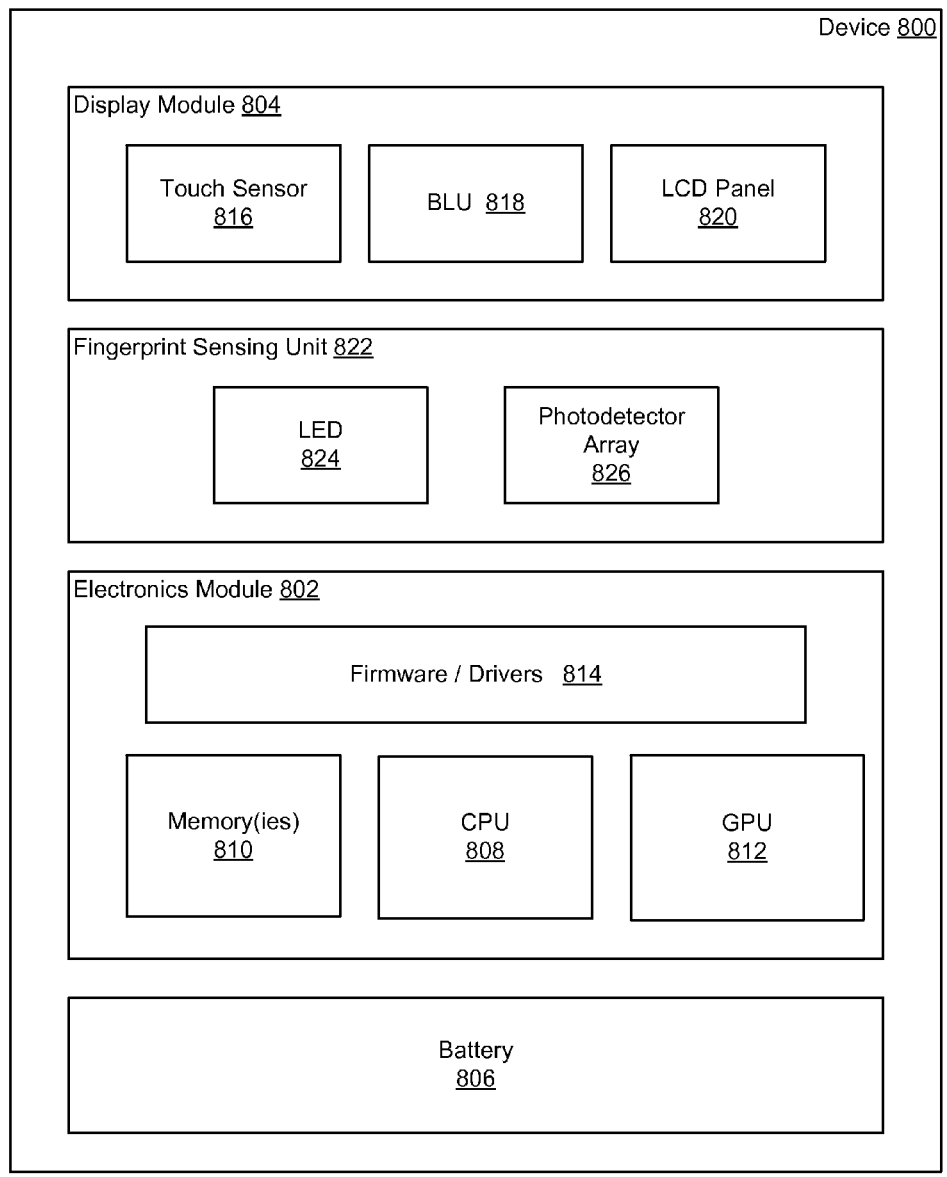
FIG. 8 is a block diagram of an electronic device in which transparent cover-based fingerprint detection may be used in accordance with one example.

FIG. 8 shows an exemplary electronic device 800 in which the above-described fingerprint detection techniques may be implemented. The device 800 includes an electronics module 802 and a display module 804 (or subsystem), and a battery 806. The electronic device 800 may include additional, fewer, or alternative components. For example, the display module 804 may be integrated with the electronics module 802 and/or other components of the electronic device 800 to a varying extent. For instance, the electronics module 802 and/or the display module 804 may include a graphics subsystem of the electronic device 800. Any number of display modules or systems may be included. In this example, the device 800 includes a processor 808 and one or more memories 810 separate from the display module 804. The processor 808 and the memories 810 may be directed to executing one or more applications implemented by the device 800. The display module 804 generates a user interface for an operating environment (e.g., an application environment) supported by the processor 808 and the memories 810. The processor 808 may be a general-purpose processor, such as a central processing unit (CPU), or any other processor or processing unit. Any number of such processors or processing units may be included.

In the example of FIG. 8, the electronics module 802 includes a graphics processing unit (GPU) 812 and firmware and/or drivers 814. The GPU 812 may be dedicated to graphics- or display-related functionality and/or provide general processing functionality. Some of the components of the electronics module 802 may be integrated. For example, the processor 808, the one or more of the memories 810, the GPU 812, and/or the firmware 814 may be integrated as a system-on-a-chip (SoC) or application-specific integrated circuit (ASIC). The electronics module 802 may include additional, fewer, or alternative components. For example, the electronics module 802 may not include a dedicated graphics processor, and instead rely on the CPU 808 or other general-purpose processor to support the graphics-related functionality of the electronic device 800. The electronics module 802 may include additional memory (or memories) to support display-related processing.

In the example of FIG. 8, the display module 804 includes a touch sensor unit 816, a backlight unit (BLU) 818, and an LCD panel or unit 820. The backlight unit 818 may be configured in accordance with one of the examples described above to provide a narrow viewing angle display. Additional, fewer, or alternative display components may be provided. For example, in some cases, the display module 804 does not include the touch sensor unit 816 and/or the BLU 818.

The device 800 further includes a fingerprint sensing unit 822 that, in turn, includes a light source 824 (e.g., an LED device) and a detector 826 (e.g., a photodetector array). In this example, the fingerprint sensing unit 822 is controlled by the electronics module 802. For instance, during operation, the CPU 808 may direct the light source 824 to generate light to illuminate the fingerprint via the transparent cover as described above. The CPU 808 may then direct the detector 826 to generate signals indicative of the fingerprint by capturing the light scattered thereby. One or more drivers of the firmware 814 may be used to these ends. The fingerprint sensing unit 822 may be integrated with the display module 804 to any desired extent.

The device 800 may be configured as one of a wide variety of computing devices, including, but not limited to, handheld or wearable computing devices (e.g., tablets and watches), communication devices (e.g., phones), laptop or other mobile computers, personal computers (PCs), server computers, set top boxes, programmable consumer electronics, network PCs, minicomputers, mainframe computers, audio or video media players, and other devices. The device 800 may also be configured as an electronic display device, such as a computer monitor, a television, or other display or visual output device.

In one aspect, an electronic device includes a transparent cover and a light source adjacent to the transparent cover. The light source is configured to inject light into the transparent cover. The transparent cover guides the light until an interaction at the transparent cover. The electronic device further includes a filter disposed along the transparent cover. The filter is configured to selectively allow the light scattered by the interaction to pass through the filter. The electronic device further includes a detector configured to generate a signal indicative of the scattered light allowed through the filter.

In another aspect, an electronic device includes a transparent cover having an exposed front face and a rear face opposite the front face. A light source is disposed at an edge of the transparent cover. The light source is configured to inject light into the transparent cover. The transparent cover guides the light until interaction with a fingerprint ridge at the front face of the transparent cover. A filter layer is disposed along the rear face of the transparent cover. The filter layer is configured to selectively allow the light scattered by the fingerprint ridge to pass through the filter layer. A photodetector circuit is disposed along the filter layer. The photodetector circuit is configured to generate an output indicative of the fingerprint ridge based on the scattered light allowed through the filter layer.

In yet another aspect, an electronic device includes a transparent cover, a touch sensing unit disposed along the transparent cover, and a display module disposed along the transparent cover in a display area adjacent a fingerprint sensor area. A light source is disposed at an edge of the transparent cover. The light source is configured to inject light into the transparent cover. The transparent cover guides the light until interaction with a fingerprint ridge at the transparent cover. A filter layer is disposed along the transparent cover in the fingerprint sensor area. The filter layer is configured to selectively allow the light scattered by the fingerprint ridge to pass through the filter layer. A photodetector circuit is disposed along the filter layer. The photodetector circuit is configured to generate an output indicative of the fingerprint ridge based on the scattered light allowed through the filter layer. The transparent cover and the touch sensing unit extend across the display area and the fingerprint sensor area.

In connection with any one of the aforementioned aspects, the electronic device may alternatively or additionally include any combination of one or more of the following aspects or features. The filter includes an optical fiber faceplate disposed between the transparent cover and the detector. Each optical fiber of the optical fiber faceplate is oriented to guide the light scattered by the interaction to the detector if the light is directed at an angle within a cone of acceptance of the optical fiber. The filter is configured to prevent the light scattered by the interaction from reaching the detector if the light is not directed at an angle within the cone of acceptance of each optical fiber of the optical fiber faceplate. The filter further includes a plurality of opaque regions, each opaque region being interstitially disposed between respective adjacent optical fibers of the optical fiber faceplate and configured to absorb the light scattered by the interaction and not directed at an angle within the cone of acceptance of each optical fiber of the optical fiber faceplate. Each optical fiber of the optical fiber faceplate and the plurality of opaque regions are arranged in a fiber bundle, the fiber bundle having a first end disposed adjacent the transparent cover and a second end disposed adjacent the detector. The transparent cover, the filter, and the detector are curved. The transparent cover, the filter, and the detector are flexible. The filter includes a film disposed in a stacked arrangement between the transparent cover and the detector. The film includes a material having a refractive index lower than a refractive index of the transparent cover. The refractive index of the film is less than 1. The interaction is between the light and a fingerprint ridge. The electronic device further includes a touch sensing unit disposed along the transparent cover, and a display module disposed along the transparent cover in a display area adjacent a fingerprint sensor area in which the filter and the detector are disposed. The transparent cover and the touch sensing unit extend across the display area and the fingerprint sensor area. The transparent cover has a thickness greater than about 300 microns. The transparent cover, the filter, and the detector are disposed in a layered arrangement. The filter is secured to the transparent cover by an adhesive layer of the layered arrangement. The adhesive layer has a refractive index that does not match a refractive index of the transparent cover. The filter layer includes a plurality of optical fibers disposed between the transparent cover and the photodetector circuit, each optical fiber being oriented to guide the light scattered by the fingerprint ridge to the photodetector circuit if the light is directed at an angle within a cone of acceptance of the optical fiber. The filter layer is configured to prevent the light scattered by the fingerprint ridge from reaching the photodetector circuit if the light is not directed at an angle within the cone of acceptance of a respective optical fiber of the plurality of optical fibers. The electronic device further includes a touch sensing unit disposed along the transparent cover, and a display module disposed along the transparent cover in a display area adjacent a fingerprint sensor area in which the filter layer and the photodetector circuit are disposed. The transparent cover and the touch sensing unit extend across the display area and the fingerprint sensor area. The filter layer includes a plurality of optical fibers disposed between the transparent cover and the photodetector circuit, each optical fiber being oriented to guide the light scattered by the fingerprint ridge to the photodetector circuit if the light is directed at an angle within a cone of acceptance of the optical fiber. The filter layer is configured to prevent the light scattered by the fingerprint ridge from reaching the photodetector circuit if the light is not directed at an angle within the cone of acceptance of a respective optical fiber of the plurality of optical fibers.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An electronic device comprising:
a display module;
a transparent cover that defines an external surface of the display module;
a light source adjacent to the transparent cover, the light source being configured to inject light into the transparent cover, the transparent cover being configured to guide the light to an interaction at the transparent cover;
a filter disposed along the transparent cover, the filter being configured to selectively allow the light scattered by the interaction to pass through the filter; and
a detector configured to generate a signal indicative of the scattered light allowed through the filter.

2. The electronic device of claim 1, wherein:
the filter comprises an optical fiber faceplate disposed between the transparent cover and the detector, each optical fiber of the optical fiber faceplate being oriented to guide the light scattered by the interaction to the detector if the light is directed at an angle within a cone of acceptance of the optical fiber; and
the filter is configured to prevent the light scattered by the interaction from reaching the detector if the light is not directed at an angle within the cone of acceptance of each optical fiber of the optical fiber faceplate.

3. The electronic device of claim 2, wherein the filter further comprises a plurality of opaque regions, each opaque region being interstitially disposed between respective adjacent optical fibers of the optical fiber faceplate and configured to absorb the light scattered by the interaction and not directed at an angle within the cone of acceptance of each optical fiber of the optical fiber faceplate.

4. The electronic device of claim 3, wherein each optical fiber of the optical fiber faceplate and the plurality of opaque regions are arranged in a fiber bundle, the fiber bundle having a first end disposed adjacent the transparent cover and a second end disposed adjacent the detector.

5. An electronic device comprising:
a transparent cover;
a light source adjacent to the transparent cover, the light source being configured to inject light into the transparent cover, the transparent cover being configured to guide the light to an interaction at the transparent cover;
a filter disposed along the transparent cover, the filter being configured to selectively allow the light scattered by the interaction to pass through the filter; and
a detector configured to generate a signal indicative of the scattered light allowed through the filter;
wherein the transparent cover, the filter, and the detector are curved.

6. An electronic device comprising:
a transparent cover;
a light source adjacent to the transparent cover, the light source being configured to inject light into the transparent cover, the transparent cover being configured to guide the light to an interaction at the transparent cover;
a filter disposed along the transparent cover, the filter being configured to selectively allow the light scattered by the interaction to pass through the filter; and
a detector configured to generate a signal indicative of the scattered light allowed through the filter;
wherein the transparent cover, the filter, and the detector are flexible.

7. An electronic device comprising:
a transparent cover;
a light source adjacent to the transparent cover, the light source being configured to inject light into the transparent cover, the transparent cover being configured to guide the light to an interaction at the transparent cover;
a filter disposed along the transparent cover, the filter being configured to selectively allow the light scattered by the interaction to pass through the filter; and
a detector configured to generate a signal indicative of the scattered light allowed through the filter;
wherein:
the filter comprises a film disposed in a stacked arrangement between the transparent cover and the detector; and
the film comprises a material having a refractive index lower than a refractive index of the transparent cover.

8. The electronic device of claim 7, wherein the refractive index of the film is less than 1.

9. The electronic device of claim 1, wherein the interaction is between the light and a fingerprint ridge.

10. The electronic device of claim 1, further comprising a touch sensing unit disposed along the transparent cover;
wherein the display module is disposed along the transparent cover in a display area adjacent a fingerprint sensor area in which the filter and the detector are disposed;
wherein the transparent cover and the touch sensing unit extend across the display area and the fingerprint sensor area.

11. The electronic device of claim 1, wherein the transparent cover has a thickness greater than about 300 microns.

12. The electronic device of claim 1, wherein:
the transparent cover, the filter, and the detector are disposed in a layered arrangement;
the filter is secured to the transparent cover by an adhesive layer of the layered arrangement; and
the adhesive layer has a refractive index that does not match a refractive index of the transparent cover.

13. An electronic device comprising:
a display module;
a transparent cover having an exposed front face and a rear face opposite the front face, the transparent cover defining an external surface of the display module;
a light source disposed at an edge of the transparent cover, the light source being configured to inject light into the transparent cover, the transparent cover guiding the light until interaction with a fingerprint ridge at the front face of the transparent cover;
a filter layer disposed along the rear face of the transparent cover, the filter layer being configured to selectively allow the light scattered by the fingerprint ridge to pass through the filter layer; and
a photodetector circuit disposed along the filter layer, the photodetector circuit being configured to generate an output indicative of the fingerprint ridge based on the scattered light allowed through the filter layer.

14. The electronic device of claim 13, wherein:
the filter layer comprises a plurality of optical fibers disposed between the transparent cover and the photodetector circuit, each optical fiber being oriented to guide the light scattered by the fingerprint ridge to the photodetector circuit if the light is directed at an angle within a cone of acceptance of the optical fiber; and
the filter layer is configured to prevent the light scattered by the fingerprint ridge from reaching the photodetector circuit if the light is not directed at an angle within the cone of acceptance of a respective optical fiber of the plurality of optical fibers.

15. The electronic device of claim 13, wherein:
the filter layer comprises a film disposed in a stacked arrangement between the transparent cover and the photodetector circuit; and
the film comprises a material having a refractive index lower than a refractive index of the transparent cover.

16. The electronic device of claim 13, further comprising a touch sensing unit disposed along the transparent cover;
wherein the display module is disposed along the transparent cover in a display area adjacent a fingerprint sensor area in which the filter layer and the photodetector circuit are disposed;
wherein the transparent cover and the touch sensing unit extend across the display area and the fingerprint sensor area.

17. An electronic device comprising:
a transparent cover;
a touch sensing unit disposed along the transparent cover;
a display module disposed along the transparent cover in a display area adjacent a fingerprint sensor area, the transparent cover defining an external surface of the display module;
a light source disposed at an edge of the transparent cover, the light source being configured to inject light into the transparent cover, the transparent cover guiding the light until interaction with a fingerprint ridge at the transparent cover;
a filter layer disposed along the transparent cover in the fingerprint sensor area, the filter layer being configured to selectively allow the light scattered by the fingerprint ridge to pass through the filter layer; and a photodetector circuit disposed along the filter layer, the photodetector circuit being configured to generate an output indicative of the fingerprint ridge based on the scattered light allowed through the filter layer;

wherein the transparent cover and the touch sensing unit extend across the display area and the fingerprint sensor area.

18. The electronic device of claim 17, wherein:

the filter layer comprises a plurality of optical fibers disposed between the transparent cover and the photodetector circuit, each optical fiber being oriented to guide the light scattered by the fingerprint ridge to the photodetector circuit if the light is directed at an angle within a cone of acceptance of the optical fiber; and the filter layer is configured to prevent the light scattered by the fingerprint ridge from reaching the photodetector circuit if the light is not directed at an angle within the cone of acceptance of a respective optical fiber of the plurality of optical fibers.

19. The electronic device of claim 17, wherein:

the filter layer comprises a film disposed in a stacked arrangement between the transparent cover and the photodetector circuit; and the film comprises a material having a refractive index lower than a refractive index of the transparent cover.

20. The electronic device of claim 19, wherein the transparent cover, the film, and the photodetector circuit are flexible.

* * * * *